FIG. 1

INVENTORS
WILSON C. PINE
HERBERT W. WESTEREN
WILLIAM H. KIMBALL

ATTORNEYS

FIG. 2

INVENTORS
WILSON C. PINE
HERBERT W. WESTEREN
WILLIAM H. KIMBALL
BY Salter & Michaelson
ATTORNEYS

INVENTORS
WILSON C. PINE
HERBERT W. WESTEREN
WILLIAM H. KIMBALL
BY *Salter & Michaelson*
ATTORNEYS

FIG. 5

July 28, 1970  W. C. PINE ET AL  3,522,357
VACUUM FURNACE HAVING A LIQUID QUENCH AND A VERTICALLY
MOVABLE WORK HOLDER
Filed Feb. 3, 1969  5 Sheets-Sheet 5

INVENTORS
WILSON C. PINE
HERBERT W. WESTEREN
WILLIAM H. KIMBALL

Salter & Nicholson
ATTORNEYS

United States Patent Office 3,522,357
Patented July 28, 1970

3,522,357
VACUUM FURNACE HAVING A LIQUID QUENCH AND A VERTICALLY MOVABLE WORK HOLDER
Wilson C. Pine, Cranston, Herbert W. Westeren, Barrington, and William H. Kimball, Providence, R.I., assignors to C. I. Hayes Inc., Cranston, R.I., a corporation of Rhode Island
Filed Feb. 3, 1969, Ser. No. 796,085
Int. Cl. H05b 3/60, 3/62; F27b 1/00
U.S. Cl. 13—31                                15 Claims

ABSTRACT OF THE DISCLOSURE

An electric furnace for heat treating metallic articles under vacuum and including a quench zone to which the heat treated articles are directed after the heat treating operation, the heating chamber in the furnace being located in coaxial relation with respect to the quench zone, and a vacuum gate being disposed between the quench zone and heating chamber and controlling communication therebetween.

BACKGROUND OF THE INVENTION

The present invention relates to furnaces for heat treating metallic articles and vacuum furnaces having a liquid quench system incorporated therein.

The technique of quenching heat treated metallic articles in a quench tank in a subatmospheric environment is disclosed in copending application Ser. No. 422,617, filed Dec. 31, 1964, now Pat. 3,441,452, issued Apr. 29, 1969, and in copending application Ser. No. 710,086, filed Mar. 4, 1968. As disclosed in these copending applications, quenching of metallic articles in a liquid that is exposed to a subatmospheric environment produces an exceptionally clean surface on the heat treated articles. In the practice of quenching the heat treated articles in a liquid while under vacuum, as disclosed in the aforesaid copending applications, the heat treated articles are first moved from the heat treating chamber to a transfer zone and are then transferred into the quench liquid as contained in a quench tank located below the transfer zone. Although this procedure of quenching the heat treated articles under vacuum did produce the required result in that exceptionally clean and bright surfaces were obtained on the articles, it has been found that the procedure was not entirely adequate in the heat treatment of certain types of high tensile and/or high stress materials which required extremely rapid quenching in order to obtain the necessary results.

Certain types of alloys require the use of unusual heat treating procedures that will prevent surface oxidation or decarburizing. If the proper heat treatment procedure is not employed, structural changes can also occur in the metal that will cause failures when the article from which the alloy is fabricated is subjected to high stress requirements. In the heat treatment of such alloys, quenching becomes quite critical and must be rapidly performed. Water is known to be a rapid quench medium, but when articles are quenched under vacuum or water, special precautions must be taken to prevent the water from vaporizing and contaminating the heating chamber. Further, the quench tank must be effectively sealed from the heating chamber during the heat treating operation so as to prevent entry of water vapor therein.

SUMMARY OF THE INVENTION

The present invention relates to a high vacuum electric furnace having quenching apparatus that is isolated from the furnace heating chamber during heat treatment, but that is adapted to immediately receive heat treated metallic articles therein after the heat treating operation, thereby providing for rapid quenching of the articles. The quenching zone as embodied in the present invention is located directly below the heating chamber of the furnace in coaxial relation, thus enabling the work load to be moved in a straight-line vertical direction from the heating chamber into the quench tank as located in the quench zone. This single direction of movement of the work load increases the speed of the quench operation which is necessary when certain metals are employed that require a bright and clean surface and have design properties that will enable the material to be subjected to high stress loads. The quench medium employed in the present invention may be oil or water depending on the articles that are heat treated, although in the present invention the use of water is contemplated and thus requires a special gate valve assembly that controls communication between the heating chamber and the quench tank. Further, when water is used as the quench medium, in order to prevent water vapor from entering into the heating zone, the interior of the quench tank is maintained at a greater vacuum than the heating chamber from which the heat treated articles are discharged, the difference in pressure between the quench tank and heating chamber promoting the down-flow of atmosphere. The quench medium that is located in the quench tank is also rapidly circulated, which action cooperates with the downflow of gases from the heating chamber to entrain and entrap any vapors that might result when the heat treated articles are discharged in the liquid quench medium located in the quench tank. The gate assembly as employed in the construction of the present invention includes a unique gate support and eccentric lifting device that are operable by special control apparatus for movement of a vacuum gate valve into sealing engagement with a reduced neck section located between the quench tank and heating chamber.

The present invention also contemplates removal of the heat treated and quenched articles from the furnace unit by physically withdrawing the quench tank from its position below the heating chamber and then inserting a second work holder into the furnace unit below the heating chamber, the second work holder thereafter being drawn upwardly into the heating chamber for repeating the heat treating operation. Thus removal and insertion of a work holder with the articles therein from or into the heating chamber is accomplished by movement of the work holder out of and into the furnace unit housing at the bottom thereof.

The invention also contemplates a work holder that is defined by a plurality of independently removable article holding trays, spaces being formed between the trays when they are assembled to provide for more effective heat treating and quenching of the articles located in the trays.

Accordingly, it is an object of the present invention to provide a high vacuum electric furnace for heat treating and quenching metallic articles in such a manner as to provide for maximum performance of the articles in use, and to further prevent contamination of the surfaces of the articles during the heat treating and quenching operations.

Another object of the invention is to provide a high vacuum electric furnace in which articles to be heat treated are moved directly from a heating zone into a quench tank, the heating zone and quench tank being maintained under subatmospheric conditions during the heating and quenching operations.

Still another object is to provide a quench system for use in a high vacuum furnace wherein water is employed as the quench medium and special circulating apparatus is provided for preventing liquid vapors from backfilling into the furnace area during the quenching operation.

Still another object is to provide a quench system for use in a high vacuum electric furnace, wherein metallic articles are quenched in a subatmospheric environment, the quenching procedure providing for establishment of a greater vacuum in the quench zone than that in the furnace area from which the articles are discharged, the difference in vacuum between the heating chamber and the quench zone inducing a down-flow of atmosphere from the heating chamber to the quench zone.

Still another object is to provide a gate assembly for use in a high vacuum electric furnace that controls communication between the heating chamber and quench area by effecting a seal with an intermediate neck section, the gate assembly including means for moving a gate valve into and out of a sealing position thereof with the neck section.

Still another object is to provide apparatus for withdrawing a quench tank from the furnace unit after the quenching of heat treated articles therein, and additional apparatus for reinserting a second work holder containing work pieces therein into the furnace unit for introduction into the heating chamber for the heat treatment of the work pieces therein.

Still another object is to provide a work basket comprised of a plurality of spaced trays, the spacing between the trays promoting more effective heat treating and quenching of the articles located therein.

Other objects, features and advantages of the invention shall become apparent as the description thereof proceeds when considered in connection with the accompany illustrative drawings.

DESCRIPTION OF THE DRAWINGS

In the drawings which illustrate the best mode presently contemplated for carrying out the present invention.

DESCRIPTION OF THE INVENTION

Figure 1:
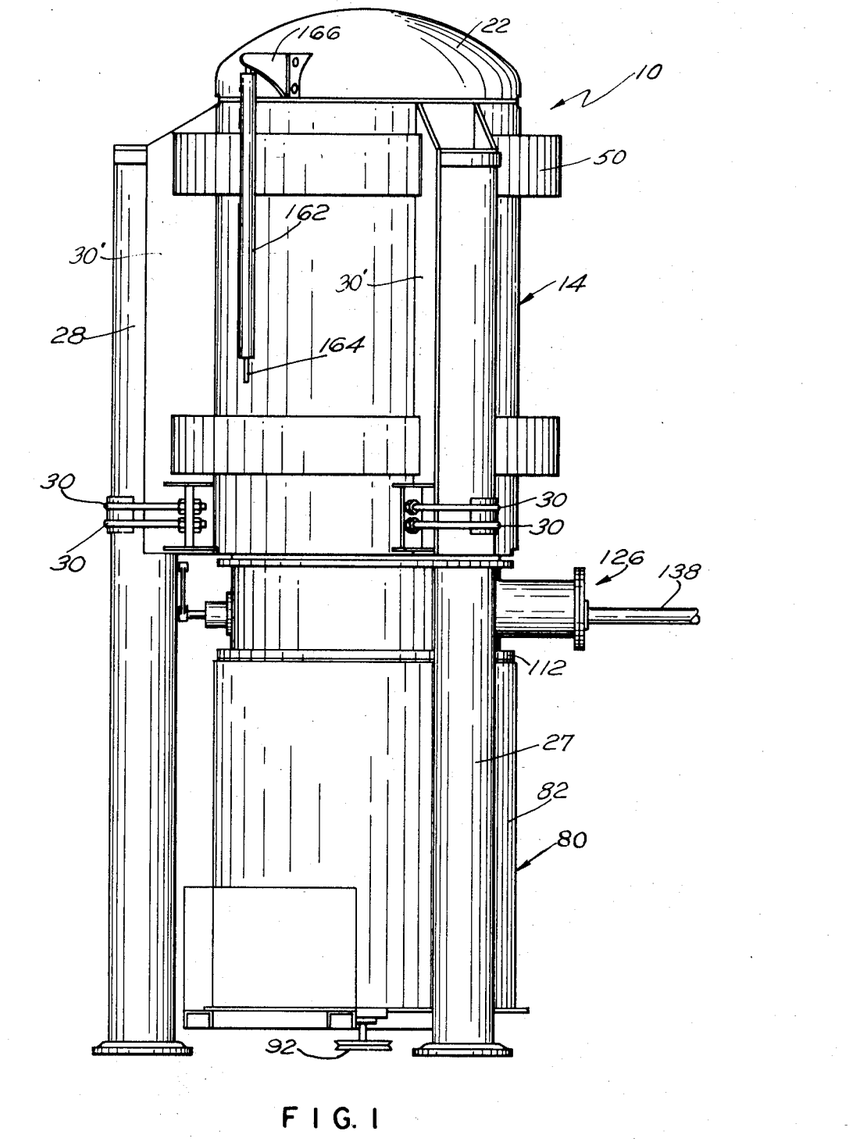
FIG. 1 is an elevational view of the high vacuum electric furnace and quenching apparatus embodied in the present invention.
Figure 2:
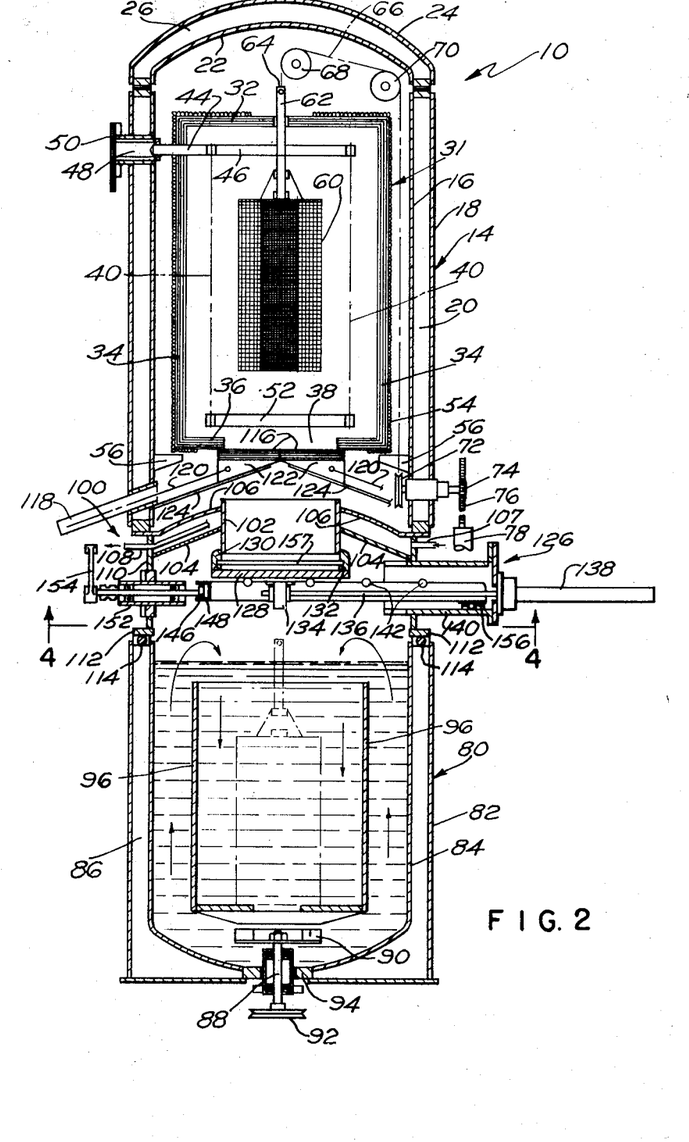
FIG. 2. is a vertical sectional view of the furnace illustrated in FIG. 1.
Figure 3:
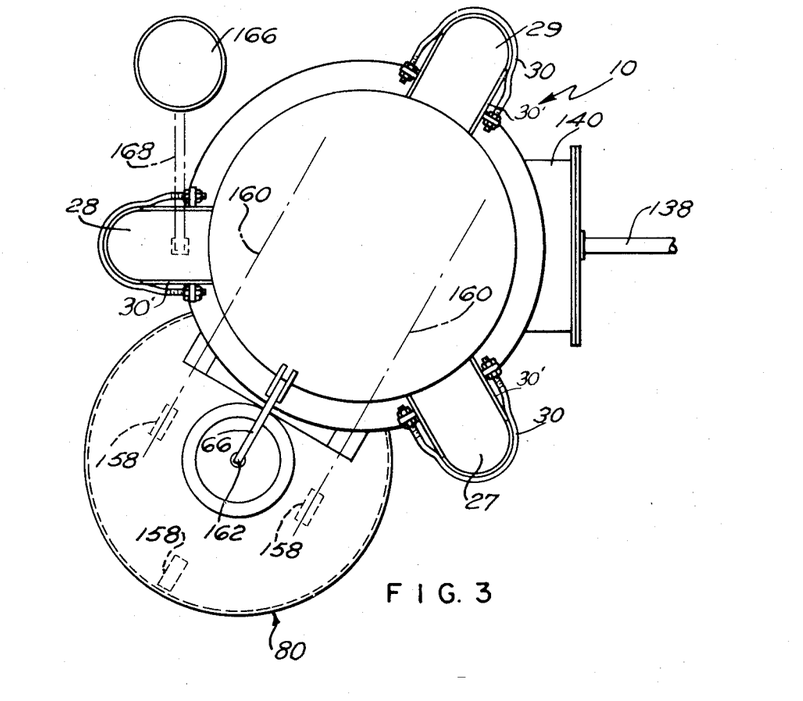
FIG. 3 is a top plan view of the furnace illustrated in FIG. 1.
Figure 5:
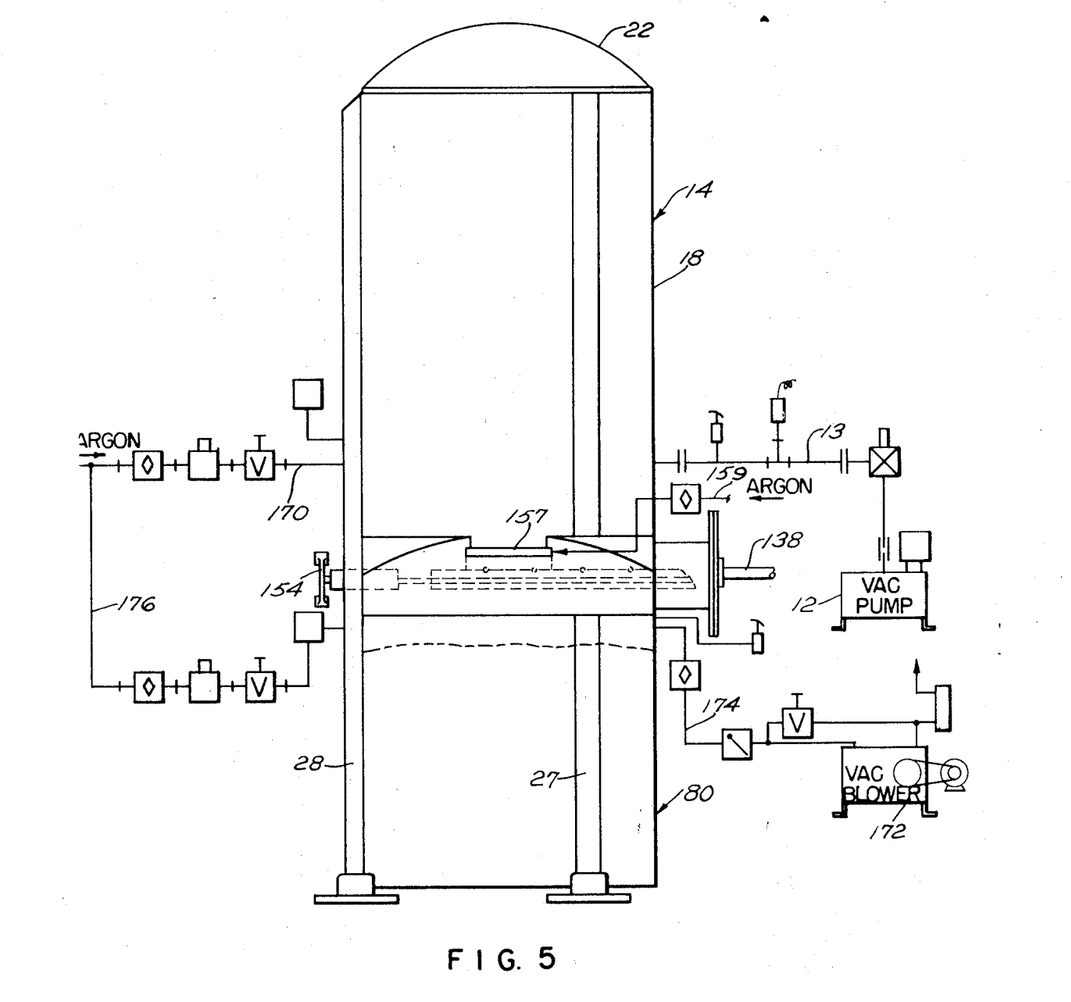
FIG. 5 is a diagrammatic illustration showing the flow path of the vacuum lines and atmosphere inlet lines that communicate with the heating chamber quench zone.

Referring now to the drawings and more particularly to FIGS. 1 through 3, the high vacuum electric furnace embodied in the present invention is illustrated and is generally indicated at 10. The vacuum furnace 10 is adapted to be operated within certain vacuum ranges; and under certain conditions the vacuum may be in the range of $10^{-4}$, $10^{-5}$ mm. Hg. For this purpose suitable vacuum equipment is connected to the furnace for evacuating the interior thereof as required, and as illustrated in FIG. 5, a vacuum pump 12 is interconnected through conventional connections to the furnace housing, through a vacuum line 13, as will be discribed hereinafter.

As illsutrated in FIGS. 1 and 2 the vacuum furnace 10 includes a housing generally indicated at 14 having an inner shell 16 from which an outer shell 18 is spaced, the inner and outer shells 16 and 18 defining a cooling space 20 through which a cooling fluid such as water is circulated. Mounted on the inner and outer shells 16 and 18 is a dome that is defined by an inner wall 22 and outer wall 24 that cooperate to form a cooling space 26 through which a cooling medium is circulated. It is understood that the cooling fluid that is circulated in the spaces 20 and 26 maintains the temperature of the housing walls at a prescribed level.

Supporting the housing 14 in elevated position are spaced columns 27, 28 and 29 that are secured to the housing by U brackets 30 through plates 30' that are welded to the outer wall 24 of the housing. The columns 27, 28 and 29 are located approximately 120° apart and thereby provide for insertion and removal of a quench tank beneath the housing 14 as will be described hereinafter. It is understood that the columns 27, 28 and 29 normally rest on the floor in the area where the furnace is located.

Located within the housing 14 is a heating chamber generally indicated at 31 that is defined by walls that are composed of a series of laminated graphite felt sections which are represented as an upper wall 32, an annular side wall 34 and an open-ended bottom wall 36 having an opening 38 formed therein. Located within the heating chamber 31 is a plurality of woven graphite flexible heating elements, indicated at 40, and a more complete description of which is contained in U.S. Pat. No. 3,257,492. A plurality of terminals, one of which is indicated at 44, are adapted to be electrically connected to the heating elements 40 through sections represented at 46, which are connected to a source of power by way of terminal connections, one of which is indicated at 48. A terminal guard 50 overlies each of the terminal connections 48 for protection thereof. In order to conveniently mount the graphite felt sections, a cage cover 54, also formed of a metal material, is located in enveloping relation around the sections and is supported within the heating chamber by means of brackets 56.

Mounted for vertical movement within the heating chamber 31 is a work basket 60 formed of non-magnetic materials and having a hollow center to eliminate the need for deep penetration of heat or quenching medium and thereby promoting a more effective quenching when the work basket is introduced into the quench zone. Fixed to the upper end of the basket 60 is a rod 62 that projects through an opening in the upper wall 32 of the graphite felt sections. A hole is formed adjacent the upper end of the rod 62 in which a clevis pin 64 is received for securing a chain 66 thereto. The chain 66 extends over pulleys 68 and 70 that are located at the upper end of the furnace housing 14 and projects downwardly through the housing for engagement around a take-up pulley 72 that is located adjacent to the lower end of the housing. The take-up pulley 72 is operatively driven externally of the housing 14 by a gear 74 that engages a rack 76 mounted for reciprocating movement in a control cylinder 78. It is seen that operation of the control cylinder 78 will produce a linear movement of the rack 76 and a corresponding movement of the basket 60 in a vertical direction through movement of the gear 74, take-up pulley 72 and chain 66.

Located below the housing 14 and in coaxial alignment therewith and the heating chamber 31 is a quench zone in which a quench tank generally indicated at 80 is removably positioned. The quench tank 80 includes an outer wall 82 and an inner wall 84 that define a space 86 therebetween through which a cooling medium is circulated.

Extending through the outer and inner walls of the quench tank 80 is a drive shaft 88 to which an impeller 90 is connected interiorly of the tank 80. A pulley 92 is mounted on the exterior end of the shaft 88 and is operatively connected to a motor for driving the impeller 90. A rotary feed-through indicated at 94 provides for rotation of the shaft 88 in the tank 80 in a lead-proof manner, while located interiorly of the tank 80 is an annular baffle 96 that defines an enclosure into which the basket 60 is adapted to be introduced during the quenching operation. As illustrated by the arrows in FIG. 2, the impeller 90 is adapted to circulate the quench medium such as water, within the tank 80 so as to produce downwardly descending columns of the quench medium toward the center of the tank to entrain and entrap any vapors that may have been produced during the quenching operation. For a more complete description of the manner in which the vaporization of the quench medium is prevented from entering into the furance area, reference is made to copending application Ser. No. 710,086. As will be described, the quench tank 80 is adapted to be located in sealing relation with respect to the furnace housing 14, this sealing relation being accomplished by means of a vacuum that is created within the quench zone and furnace areas. A more complete description of the manner in which the quench tank is sealed will be set forth hereinafter.

As further illustrated in FIG. 2, communication between the heating chamber 31 and the quench tank 80 is provided through an intermediate portion generally indicated at 100. The intermediate portion includes a reduced neck section 102 that is located in coaxial relation beneath the heating chamber 31 and above the quench tank 80. The neck section 102 is mounted on spaced wall sections 104 and 106 between which a cooling fluid is circulated. The cooling fluid is introduced into the space between the walls 104 and 106 through an inlet tube 107 and is discharged therefrom through an exhaust tube 108. The wall section 106 is fixed to the lower ends of the housing walls 16 and 18 in sealed relation and appropriate conduits are connected to the tubes 107 and 108 for circulation of the cooling medium through the spaced supporting wall sections 104 and 106. The wall sections 104 and 106 are also sealed to an intermediate wall section 110 that is located below the housing 14 and that carries an annular flange 112 at the lowermost end thereof to which the quench tank 80 is adapted to be sealed by means of an O-ring seal 114. The basket 60 is adapted to be directed through the reduced neck section 102 for entry into the quench tank 80; and in order to provide for entry of the work basket 60 through the reduced neck section 102, doors 116 that are also formed of graphite felt material are movable from the closed position, as shown in FIG. 2, to an open position by control cylinders 118, only one of which is illustrated. Connected to the cylinders 118 through a control rod 120 are triangular slide plates 122 that are mounted on inclined tracks 124, the doors 116 being secured to the slide plates 122 and movable therewith. It is seen that operation of the cylinders 118 will cause the slide plates 122 and the doors 116 located thereon to reciprocate on the inclined tracks 124, thereby moving the doors 116 to an open or closed position as required.

Figure 4:
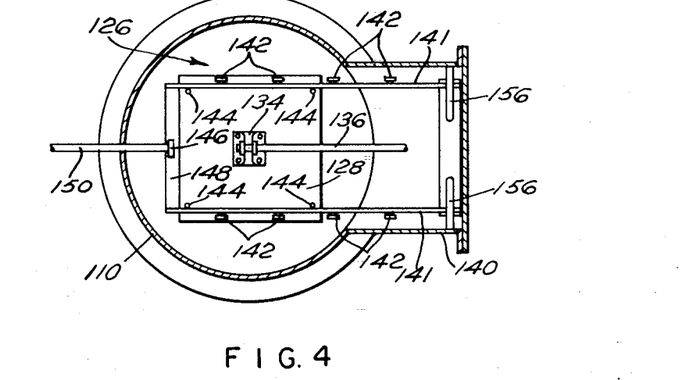
FIG. 4 is a sectional view taken along line 4—4 in FIG. 2.

Normally, water is used as the quench medium in the quench tank 80, and thus during the heat treating operation, it is necessary to seal the area in the intermediate portion 100 above the neck section 102 and the interior of the housing 14 including the heating chamber 31 from the quench tank 80. For this purpose a gate valve assembly generally indicated at 126 is provided. The gate valve assembly includes a vacuum gate 128 that is movable into sealing engagement against a flange 130 that is secured to the neck section 102, an O-ring 132 being mounted in the flange 130 and receiving the gate 128 in sealing relation thereagainst. As illustrated in FIG. 4, a bracket 134 is attached to the underside of the gate valve 128 and is interconnected to a rod 136 that is received in a control cylinder 138. The control cylinder 138 extends outwardly of the intermediate portion 100 and is connected to a sleeve 140 that is fixed in the wall 110 of the intermediate portion. It is seen that the gate valve 128 is mounted for reciprocating movement to and from the sealing area and is movable from the sealing area to an inoperative position within the sleeve 140 by operation of the cylinder 138. In order to facilitate movement of the gate valve 128 during the reciprocation thereof, elongated spaced supports 141 are provided on which rollers 142 are secured in spaced relation. As shown in FIG. 4, guide rollers 144 are fixed to the gate valve 128 and engage the inside surfaces of the spaced supports 141 and cooperate with the rollers 142 to facilitate movement of the gate 128 as it is moved to and from the sealing area. It is seen that upon operation of the cylinder 138, the rod 136 is axially moved, which produces the required movement of the gate valve 128 into or out of the sealing area.

When it is necessary to move the gate valve 128 into sealing relation with the flange 130 of the neck section 102, an eccentric cam 146 is rotated, which, as illustrated in FIGS. 2 and 4, is received within a channel 148 that is transveresly connected to the supports 141 at the inner ends thereof. Joined to the cam 146 is a control rod 150 that extends through a sealed feed-through section 152 exteriorly of the housing. A handle 154 is joined to the outermost end of the control rod 150, and provides for rotating the rod 150 so as to correspondingly rotate the eccentric cam 146. As the cam 146 is rotated, the eccentric portion thereof is urged against the upper surface of the channel 148, thereby lifting the channel and the supports 141 connected thereto. As illustrated in FIG. 4, pivot connections 156 are joined to the supports 141 adjacent to the outer ends thereof and provide for pivotal movement of the supports as the eccentric cam 146 is rotated. Since the gate 128 is mounted directly over the supports 141, pivotal movement of the supports, as indicated, will elevate the gate 128 into engagement with the flange 130 and the O ring mounted therein. A positive sealing action of the gate 128 against the O ring in the flange 130 is effected as the handle 154 is rotated to locate the eccentric portion of the cam 146 in the overcenter position thereof. When it is desired to move the gate valve 128 to the open position thereof, the handle 154 is rotated to release the eccentric cam 146 from the locked position, thereby lowering the supports 141 and the gate valve 128 therewith. The cylinder 138 is then operated to retract the rod 136 therein, wherein the gate valve 128 is moved to the inoperative position within the sleeve 140.

When the gate valve 128 is opened preparatory to the quenching operation, an inert atmosphere is also introduced into the quench neck section 102 so as to provide a protective curtain for the heating chamber. For this purpose, a perforated ring 157 is located within the flange 130 and communicates with a source of inert gas, such as argon, through a line 159 (FIG. 5).

After the quenching cycle has been completed, the work basket 60 with the heat treated articles therein is removed from the furnace unit by withdrawing the quench tank 80 from beneath the furnace housing 14. As will be described, this is accomplished after the vacuum in the quench tank and heating chamber has been relieved. Referring to FIG. 3, wheels 158 are shown located beneath the quench tank 80 and are adapted to be formed as part of a platform lift truck (not shown) on which the quench tank is mounted. The lift truck is movable, with the quench tank thereon, relative to the housing 14 and is guided by tracks 160 that extend beneath the housing. The quench tank is thus vertically movable by the lift truck to and from the sealed position with the flange 112, and is also movable with the lift truck from the coaxial position beneath the housing to an open position for removal of the work basket therefrom, this latter movement of the lift truck being guided by the tracks 160.

In order to extract the work basket 60 from the quench tank 80 after the tank has been moved to the open position thereof, a cylinder 162 is provided and has a piston rod 164 that is reciprocable therein, the cylinder 162 being interconnected to a bracket 166 that is mounted on the dome of the housing 14. It is seen that when the quench tank 80 is moved with the lift truck to the open position thereof as illustrated in FIG. 3, the rod 62 that is joined to the work basket and that has been previously disconnected from the chain 66 is then interconnected to the piston rod 164. Upon operation of the cylinder 162, the basket is lifted outwardly of the tank 80, and the heat treated articles within the basket are thereafter removed therefrom after draining of the quench liquid from the basket.

Following the removal of the work basket 60 from the quench tank 80 by operation of the cylinder 162, a second work basket is inserted into the furnace unit for heat treating the articles as contained in the second work basket. For this purpose, a rotatable platform 166 is provided and is pivotally mounted on the housing 14 through a rod 168. The platform 166 is pivotally movable beneath the housing 14 so as to position a work basket mounted thereon within the confines of the supports 27, 28 and 29, in coaxial relation beneath the heat treating chamber 31. After the second work basket has been interconnected to the chain 66, the cylinder 78 is operated to lift it to the heat treating position within the chamber 31 as illustrated in FIG. 2. The quench tank 80 is then returned to the operative position beneath the heat treating chamber by the lift truck, and the cycle of operation is repeated.

OPERATION

In operation, it is assumed that a basket loaded with articles to be heat treated in the annular zone therein has been placed in the heat treating chamber 31 as illustrated in FIG. 2 and is held in position in the heat zone by the chain 66 and the take-up pulley 72. The insulated housing doors 116 and the vacuum gate valve 138 located in the intermediate portion 100 are both disposed in the closed position. The furnace housing is then evacuated through the vacuum line 13 by the pump 12 and the diffusion pump associated therewith. When a predetermined vacuum is obtained within the furnace housing, current is supplied to the heating elements 40 through the terminals 44, and the heating zone is brought to a predetermined temperature. After the articles in the work basket 60 have been heat treated for a preselected period of time and with current still being applied to the heating elements, the pumping unit is closed off through suitable valving from the heating chamber, and an inert atmosphere, such as argon, is backfilled into the furnace housing through an inlet pipe indicated at 170 in FIG. 4. The flow to inert atmosphere is controlled so as to maintain the vacuum within the furnace housing at less than atmosphere, but at a greater pressure than that retained in the quench tank 80, as will now be described.

Prior to the introduction of the inert atmosphere into the housing 14 through the line 170, the quench tank 80 is evacuated by a vacuum blower 172 by way of a vacuum line 174. This also serves to seal the quench vessel to the flange 112 at the O ring seal 114. After the quench tank 80 has been evacuated to a predetermined vacuum, and prior to the quenching operation, an inert atmosphere is introduced therein through an inlet line 176, the flow of inert atmosphere into the quench tank being regulated so that the absolute pressure in the furnace housing is greater than that in the quench tank. At this point the exhaust blower 172 is shut down, but will be started up again when quenching operation commences.

After the heat treating cycle has been completed, quenching of the heat treated articles is then carried out in the following manner. The vacuum blower 172 is again started, along with the motor that operates the impeller 90 located within the quench tank 80. The vacuum gate 128 is opened by rotating the handle 154 which releases the eccentric cam 146. The cylinder 138 is then operated to slide the gate valve 128 to the inoperative position within the sleeve 140. At the same time, the inert atmosphere is introduced into the gas curtain ring 157 (FIG. 4) through the inlet line 159. The gas curtain created within the neck section 102 promotes a downflow of the atmosphere and further forms a shield for preventing quench vapors from entering into the furnace housing. At this time the current to the furnace heating elements is shut off, and the insulated furnace doors 116 are slidably moved to the open position by actuation of the cylinders 118. With the doors 116 and the gate valve 128 open, the cylinder 78 is automatically operated to rotate the take-up drum 72, thereby lowering the basket 60 with the heat treated articles therein through the neck section 102 and into the quench tank 80. Movement of the basket is controlled such that the basket lowers rapidly after it enters the quench liquid but then slows down in its descent as it reaches the end of its travel, whereupon the basket is caused to come to a gentle stop at the bottom of the quench tank. It is seen that during the quenching operation, the combined effect of exhausting the quench tank 80 and backfilling the furnace housing 14 with the inert atmosphere to a vacuum less than that in the quench tank results in a downflow of gas through the neck section 102, thereby preventing any backstreaming of the vaporized quench medium into the furnace. Further, the atmosphere curtain created at the neck section through the ring 157 helps to prevent any backflow of vaporized quench medium from entering into the furnace housing.

After a predetermined interval and after quench activity in the quench tank has subsided, operation of the vacuum blower 172 and the impeller 90 is discontinued. The automatic controlled backfill through the line 170 into the furnace housing is changed over to a continuous flow of the inert atmosphere, and the furnace housing and the quench tank are then backfilled to atmospheric pressure. Since the quench tank 80 is retained in the sealed position against the flange 112 by the difference in pressure within the quench area bringing the pressure to atmosphere within the furnace unit causes this seal to break, and the quench tank is released from the sealed position thereof. As the seal is broken between the quench tank and flange 112, the tank 80 is moved downwardly by the lift truck on which it is mounted to create a space at the flange 112. An operator then reaches through the space and unhooks the chain 66 from the rod 62 by pulling the clevis pin 64. With the work basket 60 released from the chain 66, the quench tank 80 is then rolled outwardly on the truck from its position beneath the furnace housing to that position illustrated in FIG. 3, thereby exposing the work basket 60 through the open top of the quench tank. The rod 62 of the quench tank is interconnected to the piston rod 164 of the cylinder 162 that is located exteriorly of the furnace housing and the cylinder 162 is actuated to withdraw the piston 164 therein, thereby lifting the basket 60 from within the quench tank to an upper position for draining of the quench liquid. At this time, a second work basket with articles to be heat treated therein is mounted on the platform 166, and the platform 166 is rotated to place the second work basket in coaxial alignment beneath the furnace housing 14. The operator then interconnects the rod 162 of the second work basket to the chain 66 by means of a clevis pin, and the cylinder 78 is actuated to rotate the take-up drum 72 for lifting the second work basket to the position within the furnace heating chamber 31 as illustrated in FIG. 2. The gate valve 128 is closed by shifting it to its position beneath the flange 130, and the eccentric 146 is rotated by the handle 154 to seal the neck section 102. The gas backfilling lines 170, 176 and the gas curtain line 180 are then shut off, and the furnace is pumped down through the vacuum pump 12 and associated diffusion pump in anticipation of the next cycle. During the next heating cycle, the first basket is removed from its position exteriorly of the heating chamber, dried and refilled with a fresh batch of articles. The quench tank is returned to its position beneath the furnace housing and lifted into contact with the seal 112. The pressure within the quench zone area is thereafter reduced to cause the quench tank to be sealed in position against the flange 112 and the cycle of operation is then repeated.

Figures 6, 7, 8, 9, 10, 11, 12:
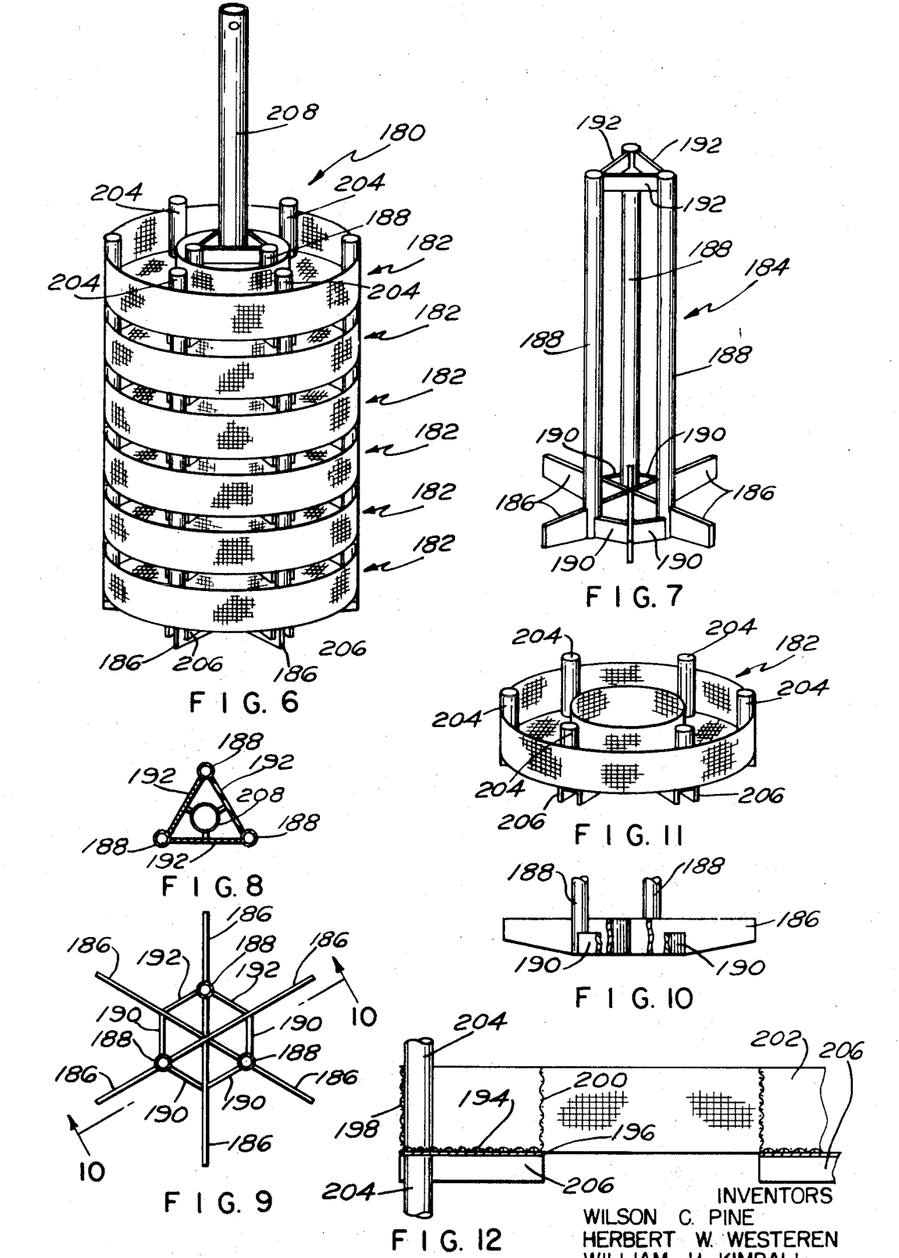
FIG. 6 is a perspective view of a modified form of work basket.
FIG. 7 is a perspective view of the frame on which trays are mounted to form the work basket illustrated in FIG. 6.
FIG. 8 is a sectional view taken along line 8—8 in FIG. 7.
FIG. 9 is a bottom plan view of the frame illustrated in FIG. 7.
FIG. 10 is a sectional view taken along line 10—10 in FIG. 9.
FIG. 11 is a perspective view of one of the trays that form a part of the work basket illustrated in FIG. 6.
FIG. 12 is an enlarged fragmentary sectional view showing the interrelation of the adjacent trays in the modified work basket.

Referring now to FIGS. 6 through 12, a modified form of the work basket is illustrated and is generally indicated at 180. The work basket 180 is designed to promote more effective heat treating and quenching of the articles carried thereby, and for this purpose includes a plurality of work trays generally indicated at 182, that are positioned in spaced vertical relation. The work trays 182 are stacked, generally indicated at 184, which as shown in FIGS. 7–9 includes base members 186 that are located at 60° intervals and are welded together at the center point of the frame. Vertical supports 188 are slotted at the lower ends thereof and are interfitted over alternately positioned base members 186. Bottom web members 190 are welded between a support 188 and an adjacent base member 186 as indicated in FIG. 9 to firmly anchor the supports in place. Upper web members 192 are joined between the supports 188 at the upper ends thereof and cooperate with the web members 190 to fix the supports in position relative to each other.

As shown in FIGS. 10–12, each of the work trays 182 includes a circular bottom wall 194 formed of a mesh material in which a central opening 196 is located. Joined to the outer marginal edge of the bottom wall 196 is an outer annular side wall 198 of a mesh material, while joined to the marginal edge of the central opening 196 is an inner annular side wall 200. The inner and outer annular side walls 198 and 200 cooperate with the bottom wall to define an annular compartment 202 in which the articles to be heat treated are received.

In order to vertically space apart the work trays 182, spacer elements 204 are provided and are secured within the annular compartment to the outer annular side wall 198 and to the bottom wall 194 at 60° intervals. Channel guards 206 are secured beneath the bottom wall 194 in alignment with the spacer elements and are dimensioned for receiving the spacer element of a below located tray therein It is seen that after the annular compartment 202 of a tray 182 is filled with the articles to be heat treated, the tray is mounted on the frame 184 by sliding over the supports 188, the center opening 196 receiving the supports 188 therethrough. The channel guards 206 of the bottom tray rest on the base members 186 and as each succeeding tray is mounted on the frame, the spacer elements 204 receive the channel guards thereon to vertically space the trays 182 as illustrated in FIG. 6. In order to mount the assembled work basket 180 within the heating chamber 31, a tube 208 is fixed to the upper web members 192 and projects thereabove as also shown in FIG. 6. A hole 210 is formed in the upper end of the tube 208 and receives a clevis pin for locking the work basket 182 to the chain 66.

In the heat treatment of the articles located in the work trays 182, the heat may circulate through the spaces therebeween, thereby avoiding uneven heating and preventing sintering or fusing of the articles. Further, since the articles are separated in trays, the load on the articles is relieved thereby avoiding sintering of the pieces that would normally be located at the bottom of the basket. Quenching is also more uniform since a highly dense mass would tend to slow down the quench time and thus could affect the metallurgical characteristics of the metal, because the outer articles would then be cooled more rapidly than the inner ones. However, in the modified work basket as described, the mass concentration is reduced, thereby relieving the load and pressure at the bottom of the basket. A better uniformity of the finished article is thus realized.

What is claimed is:

1. In a vacuum furnace for heat treating metallic articles, a housing having a heating chamber located therein, a work holder for supporting said articles in said heating chamber, a quench tank normally located below said heating chamber in coaxial relation and having a quench liquid contained therein, a reduced neck section located between said heating chamber and quench tank in coaxial relation therewith, a gate valve assembly for controlling communication between said heating chamber and quench tank and including a gate valve that is movable into engagement with said neck section for sealing said heating chamber within said housing, said gate assembly further including means for vertically moving said gate valve to effect the sealing action with said neck section and means for longitudinally moving said gate valve into and out of the position from which it is lifted to the sealing position, and means for vertically moving said work holder and articles therein from said heating chamber to said quench tank following the heat treating operation and after movement of said gate from the sealing position to the open position thereof.

2. In a vacuum furnace as set forth in claim 1, means for maintaining said heating zone and quench tank at subatmospheric pressures during the quenching operation, and means for backfilling said heating zone with an inert atmosphere to an absolute pressure greater than that in said quench tank for promoting downflow of said atmosphere into said quench tank during the quenching operation, wherein quench vapors are trapped and entrained by said atmosphere and are thereby prevented from entering into said heating zone for the contamination thereof.

3. In a vacuum furnace as set forth in claim 1, means for moving said quench tank from its position below said reduced neck section of exteriorly exposing the work holder in said quench tank, means mounted exteriorly of said housing for lifting said work holder out of said quench tank after movement thereof to the exterior position, and means for moving a second work holder having articles for heat treatment therein to a coaxial position below said neck section for connection to said vertically moving means, whereafter said second holder is withdrawn through said neck section for location within said heating chamber in preparation for the next heat treating operation.

4. In a vacuum furnace as set forth in claim 1, said gate valve assembly including members for supporting said gate valve, said members including anti-friction elements that are engageable by said gate valve for facilitating longitudinal movement of the gate valve to and from the open and closed positions thereof.

5. In a vacuum furnace as set forth in claim 4, said lifting means including a cross member joined to said supporting members at one end thereof, and an eccentric cam engageable with said cross member and being rotatable to lift said cross member for pivoting said supporting members around the end opposite to that with which said cross member is joined, wherein said gate valve is lifted by said supporting members into sealing engagement with said neck section.

6. In a vacuum furnace as set forth in claim 5, said longitudinally moving means including an elongated rod that is joined to said gate valve in articulated relation, the articulated connection between said rod and gate valve enabling said gate valve to be lifted into its sealing position without disconnection from said rod, and means connected to said rod for producing the required longitudinal movement thereof.

7. In a vacuum furnace as set forth in claim 1, said quenching operation being carried out in a subatmospheric environment whereby said quench tank is secured in vacuum tight relation to said housing, means for backfilling said quench tank to atmospheric pressure after the quenching operation, wherein the quench tank is released from engagement with said housing, means for moving said quench tank out of alignment with said housing to expose the work holder therein, means for removing the work holder from said quench tank, and means for re-inserting a second work holder into said housing through the underside thereof.

8. In a vacuum furnace for heat treating metallic articles therein, a housing supported in elevated position and having a heating chamber located therein, a work holder for supporting said articles in said heating chamber, a quench tank normally located below said heating chamber in coaxial relation and having a quench liquid contained therein, means for vertically moving said work holder from said heating chamber into said quench tank following the heat treating operation for quenching said articles, means for maintaining said heating chamber and quench tank at subatmospheric pressures during the heat treating and quenching operations, means for withdrawing said quench tank from its position below said heating chamber and exteriorly of said housing after the quenching operation, means for removing the work holder from the withdrawn quench tank, and means for inserting a second work holder in coaxial position beneath said heating chamber for attachment to said vertically moving means, whereafter said second work holder is elevated upwardly by said vertically moving means into said heating chamber for the next heat treating operation.

9. In a vacuum furnace as set forth in claim 8, a reduced neck section located between said heating chamber and quench tank, and valve means that is movable into sealing engagement with said neck section and that is operable to control communication between said heating chamber and quench tank.

10. In a vacuum furnace as set forth in claim 9, said valve means including a gate valve and means for moving said gate valve in a first direction from a closed position to a position adjacent said neck section and means for moving said gate valve in a second direction generally transverse to said first direction to locate said gate valve in sealing relation with respect to said neck section.

11. In a vacuum furnace as set forth in claim 10, said means for moving said gate valve in a first direction including a shaft mounted for reciprocating movement and that is interconnected to said gate valve.

12. In a vacuum furnace as set forth in claim 10, said means for moving said gate valve in a second direction including a support assembly that engages said gate valve and an eccentric cam engaging said support assembly and being rotatable to pivot said support assembly, thereby lifting said gate valve to the sealing position thereof.

13. In a vacuum furnace as set forth in claim 8, said withdrawing means including wheels on which said quench tank is received and movable thereon from the coaxial position beneath said housing to a position externally of said housing for exposing the work holder therein.

14. In a vacuum furnace as set forth in claim 13, said means for inserting a second work holder beneath said housing including a platform for receiving a work holder thereon and that is mounted for pivotal movement with respect to said housing for locating the second work holder thereunder in coaxial relation.

15. A vacuum furnace for heat-treating metallic articles, comprising a housing having a heating chamber located therein, a work-holder for supporting said articles in said heating chamber, a quench tank located below said heating chamber in coaxial relation and having a quench liquid contained therein, a reduced neck section located between said heating chamber and quench tank in coaxial communicating relation therewith, a valve assembly for controlling communication between said heating chamber and quench tank and including a valve for sealing said heating chamber within said housing, means for moving said valve into and out of the sealing position thereof, means in said neck section for introducing an inert gas into said neck section when said valve is located in an open position to provide a protective curtain for said heating chamber, and means for vertically moving said workholder and articles from said heating chamber to said quench tank following the heat treating operation and after movement of said valve from the sealing position to the open position thereof.

References Cited

UNITED STATES PATENTS

| | | | |
|---|---|---|---|
| 2,971,039 | 2/1961 | Westeren | 13—25 |
| 3,017,262 | 1/1962 | Fegan | 13—25 X |
| 3,155,758 | 11/1964 | Hill | 13—25 |

HIRAM B. GILSON, Primary Examiner

U.S. Cl. X.R.

13—25